United States Patent [19]

Micali

[11] Patent Number: 5,420,927
[45] Date of Patent: May 30, 1995

US005420927A

[54] METHOD FOR CERTIFYING PUBLIC KEYS IN A DIGITAL SIGNATURE SCHEME

[76] Inventor: Silvio Micali, 459 Chestnut Hill Ave., Brookline, Mass. 02146

[21] Appl. No.: 189,248

[22] Filed: Feb. 1, 1994

[51] Int. Cl.$^6$ .............................................. H04K 1/00
[52] U.S. Cl. .......................................... 380/23; 380/4; 380/21; 380/30
[58] Field of Search .................... 380/4, 23, 21, 28, 30

[56] References Cited

U.S. PATENT DOCUMENTS

| | | | |
|---|---|---|---|
| 4,326,098 | 4/1982 | Bouricious et al. | 380/23 |
| 5,214,702 | 5/1993 | Fischer | 380/30 |
| 5,261,002 | 11/1993 | Perlman et al. | 380/30 |
| 5,299,263 | 3/1994 | Beller et al. | 380/30 |
| 5,307,411 | 4/1994 | Anvret et al. | 380/30 |

*Primary Examiner*—David C. Cain
*Attorney, Agent, or Firm*—David H. Judson

[57] ABSTRACT

A method for certifying public keys of a digital signature scheme in a secure communications system is provided. The secure communications system in one in which there are authorities with previously-certified public verification keys. The method begins by having a user U present an authority a verification key $PK_U$. The authority then identifies the presenting user as U. Thereafter, the authority verifies that the presenting user knows the secret signing key associated with $PK_U$. If so, the authority computes a digital signature S relative to the authority's own public key $PK_A$ of its verification that $PK_U$ is the public key of user U. The authority then issues a certificate that $PK_U$ is the public key of user U, the certificate including both S and a certificate for $PK_A$.

23 Claims, No Drawings

METHOD FOR CERTIFYING PUBLIC KEYS IN A DIGITAL SIGNATURE SCHEME

TECHNICAL FIELD

The present invention relates generally to secure communications and more particularly to a method for certifying public keys in a digital signature scheme to facilitate widespread verification of users' digital signatures.

BACKGROUND OF THE INVENTION

In any digital signature scheme, each user has a pair of matching verification and signing keys. A user U produces his digital signature of a message M by running a special algorithm on inputs Chat include M and his signing key. Of course, it is important that the signing key be kept secret by the user. User U's digital signature of a message M can be verified by running an algorithm whose inputs include the digital signature and U's verification key. The user's verification key must be as "public" as possible to allow as universal as possible verification of U's digital signatures. For these reasons, U's verification key is also referred to as U's public key, and the corresponding signing key as U's secret key.

The question of how a user can make his own public key truly public is an important problem. One solution, namely, having each user post his own verification key in a widely accessible file (e.g., a conventional or electronic data base), is not a satisfactory solution for two reasons. First, it may be inconvenient to retrieve U's public key from such a list when a verifier is presented with U's digital signature of a given message. Second, because a malicious user W may compute a pair of matching verification and signing keys (V and S) and post V as U's verification key, the malicious user may be able to digitally-sign messages that will be believed to be coming from U. It is thus important that whenever a given user wishes to post or otherwise publicize a key V as his verification key, there must be a way to correctly determine that the user in fact elects V as his verification key. This is the requirement that each public key in a digital signature scheme be properly "certified."

Techniques for building certificates of public keys are known in the art. The traditional way envisions a hierarchy of authorities. For example, assume that there is a simple two-level hierarchy: a few thousand first-level authorities, $A'_1, A'_2, \ldots$, and a single second-level authority, $A''$. It is assumed that each of the first-level authorities is capable of digitally signing, that their public keys, $PK'_1, PK'_2, \ldots$, are already known to $A''$, and that the public-key of $A''$, $PK''$, is universally known. When a user U wishes to have his chosen public key, $PK_U$, certified, he goes to the authority, $A'_c$, closest to (or most convenient for) him. After verifying U's identity and the fact that he wishes to elect $PK_U$ as his own signing key (alternatively, $A'_c$ may receive a traditional notarized document to this effect), $A'_c$ provides U with a certificate consisting of (1) his own digital signature of $PK_U$ (relative to $PK'_c$) (2) his own public key $PK'_c$ and (3) the digital signature of $A''$ of $PK'_c$ (relative to $PK''$.) The second and third pieces of data are necessary since there may be a sufficiently-high number of first-level authorities and their public keys may not be universally known. Such a certificate is either given to user U, so that he will send it along with any digital signature of his (in order to enable anyone to verify it), or the certificate is posted in a sufficiently accessible database (so that anyone who wishes verify U's digital signature of a given message can retrieve the certificate of U's public key from the database).

In either case, a traditional certificate for $PK_U$ is quite long because it includes at least two pieces of data in addition to the signature of $PK_U$. This is undesirable, since public-key certificates must be sent along or retrieved with almost every single digital signature. Moreover, the recipient of a digital signature may wish to store its associated public-key certificate for a long time period to maintain proof of the signer's commitment. Such long certificates are thus very costly, because sending bits across communication lines (e.g., via a long-distance phone call) is expensive and because storing bits is expensive. Obviously the longer the certificate, the higher the cost associated with transmission and storage thereof.

Another problem associated with the prior art certification techniques is that such schemes provide no way for inspecting that the user U knows the secret signing key corresponding to a verification key. In particular, before an authority agrees to certify or to participate in the certification of the verification key presented by the user U, it may be important to inspect that U knows the secret signing key corresponding thereto. For example, assume a legitimate user U has already obtained a certificate that $PK_U$ is his public key. Then, a malicious user V may go to a competent authority with $PK_U$ claiming that he wishes to have this string certified as his own public key. Even if the authority verifies the identity of V, nothing so far prevents that $PK_V$ may be also certified as V's public key. While V's action may not enable him to cheat as he pleases (because he ignores $PK_U$'s matching secret key), the situation may still be quite dangerous. For instance, if it determined from other transactions that the owner of public key $PK_U$ is entitled to certain rights, then V may claim those rights for himself by exhibiting easily-obtained "certificate" that $PK_U$ is his key. As another example, V might begin by taking a message signed by U relative to $PK_U$. By adding to this signature the easily-obtained "certificate" that he owns $PK_U$, V can appear able to sign relative to $PK_U$. This cheating and confusion can cause significant problems, but traditional certificate schemes have heretofore not addressed this problem adequately.

There is thus a need to provide a new and efficient method of certifying public keys that produces very short and thus very inexpensive certificates and that further ensures that a user presenting a given verification key for certification has legitimately chosen it.

BRIEF SUMMARY OF THE INVENTION

It is an object of the present invention to provide a method for certifying data, for example, public keys in a digital signature scheme.

It is a further object of the invention to provide a method for certifying public keys of a digital signature scheme to facilitate the widespread verification of the digital signatures of the users of such scheme.

It is another object of the invention to provide techniques for generating short "certificates" for public keys.

It is yet another object of the invention to provide new and efficient public-key certification techniques which further require proof that a user presenting a given verification key for certification has legitimately chosen it.

It is an additional feature of the invention to provide a way for computing short certificates that is useful regardless of the underlying digital signature scheme.

In the broadest aspect of the invention, a method is described for certifying pieces of data in a secure communications system with at least two levels of authorities. The method begins with the presentation of a piece of data requiring certification to a first-level authority for inspection of a given property. If the piece of data passes the inspection of the first-level authority, the first-level authority sends to a second-level (i.e., a higher) authority a digital signature evidencing that the piece of data has passed the inspection of the first-level authority. If the digital signature of the first-level authority is then shown to be correct (e.g., by verifying it against the public-key of the first level authority, which is known to the second-level authority), the second-level authority issues a digital signature that the piece of data possesses the given property. Thus, rather than having a signature of the first authority on the piece of data followed by the public key of the first level authority followed by the signature of the second level authority of the first-level authority's public key, the inventive method creates a certificate that may consist only of the direct signature of the second level authority of the user's presented piece of data (i.e., the public key). This "short" certificate, nevertheless, guarantees that the piece of data has passed inspection.

For the public-key certification application, the piece of data presented is a verification key of a digital signature scheme and the given property of the presented verification key is that a given user has chosen the verification key to be his public key in the digital signature scheme.

According to a more specific application of the present invention, a method for certifying public keys of a digital signature scheme in a secure communications system is provided. The secure communications system in one in which there are authorities with previously-certified public verification keys. The method begins by having a user U present an authority a verification key $PK_U$. The authority then identifies the presenting user as U. Also, the authority verifies that the presenting user knows the secret signing key associated with $PK_U$. If so, the authority computes a digital signature S relative to the authority's own public key $PK_A$ of its verification that $PK_U$ is the public key of user U. The authority then issues a certificate that $PK_U$ is the public key of user U, the certificate including both S and a certificate for $PK_A$.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

DETAILED DESCRIPTION

Although the following discussion is in the context of certifying public keys of a digital signature scheme, it should be appreciated that the inventive technique is useful for certifying arbitrary data. Moreover, there is no requirement that the invention be implemented with any particular digital signature scheme and thus the following teachings should be considered merely exemplary and not limiting.

Assume that the authorities use a known or future digital signature scheme producing k-bit signatures, that each first-level authority $A'_i$ has independently chosen his own public key $PK'_i$, and that $A''$ has his own totally unrelated public key $PK''$. Then, when U goes to $A'_c$ with his key $PK_U$, $A'_c$ sends electronically to $A''$ both $PK_U$ and his own signature of it. This signature signifies to $A''$ that $A'_c$ has verified U's identity and U's desire to have $PK_U$ as his public key. In response to this message, $A''$ might store the signature of $A'_c$ (in order to keep $A'_c$ accountable for the keys that $A'_c$ causes to be certified), and himself signs $PK_U$ relative to $PK''$. This latter signature is a valid certificate for $PK_U$ (because the public key of $A''$ is universally known and thus anyone can check whether a digital signature of $A''$ is correct), and is sent by $A''$ to $A'_c$ (so that $A'_c$ can give it to U) or to U directly; or the signature is inserted in some accessible file or it is otherwise publicized.

In the broadest aspect of the invention, the method certifies pieces of data (such as public keys) in a secure communications system with at least two levels of authorities. The method begins with the presentation of a piece of data requiring certification to a first-level authority for inspection of a given property. If the piece of data passes the inspection of the first-level authority, the first-level authority sends to a second-level (i.e., a higher) authority a digital signature evidencing that the piece of data has passed the inspection of the first-level authority. If the digital signature of the first-level authority is then shown to be correct, the second-level authority issues a digital signature that the piece of data possesses the given property.

According to the invention each certificate consists of a single signature, that of $A''$. To generate this simple certificate, $A'_c$ must send one additional k-message (his own signature of $PK_U$), and that this transmitted message might be stored by $A''$ (to keep $A'_c$ accountable). Such transmission and storage costs, however, are incurred only once per user (when the user makes his own public key) and not every time a signature is generated. Thus, even if there were a very large number of signers over a lengthy time period, e.g., 100 million signers within the next 10 years, the technique is manageable and much more economical as compared to the prior art. In such example, there would be 100k million bits transmitted and 100k million bits stored for certification purposes. The associated certification cost, however, would be much smaller than traditional techniques. Indeed, if traditional certificates were used, each time that a user U transmitted a signature relative to his public key together with the signature of $A'_c$ of $PK_U$ relative to $PK'_c$, he would also transmit the additional k bits of the signature of $A''$ of $PK'_c$. If each user then signed 1000 messages per year, then traditional certificates would cause an additional 100k trillion bits to be transmitted and 100k trillion bits to be stored (by the recipients of the signatures) per year.

Of course, while in the present invention U must "wait" for the response of $A''$ during key registration, this response is handled totally electronically, and thus very efficiently. Even if there were 100 million keys registered in the next ten years, $A''$ has ample time to compute the corresponding 100 million signatures, even by means of a single computer. Also, the network traffic generated by this certification of 100 million public keys in 10 years is rather manageable, consisting of <28,000 short messages per day. Any time spent by U waiting for the response of A" is negligible with respect to that time taken by $A'_c$ to properly identify U in prior art schemes.

It should also be recognized that that A" may be the only authority that is capable of digitally signing. In such variation, the first-level authorities may just send to A" an otherwise different type of certification that user U really wishes to have key $PK_U$ recognized as his public key. The remainder of the technique would proceed as described above.

According to another feature of the invention, it is desirable that a user presenting a given verification key for certification be able to show that he has legitimately chosen the key. In particular, before an authority agrees to certify (or to participate in the certification of) the verification key $PK_U$ presented by a user U, it may be important to inspect that U knows the secret signing key corresponding to $PK_U$. This feature is missing in traditional certificates, and its absence creates a great deal of problems or confusion. This problem is solved by the invention by ensuring that during the certification of a public key (whether or not there is a hierarchy of authorities), some authority inspects that the user presenting a given verification key for certification has legitimately chosen it.

One way to accomplish this is to have this authority verify that the presenting user knows the corresponding secret signing key. This can be done by asking the user to sign a given message. While the given message might always be the same one, such a technique is not the preferred method because a malicious V may get hold of U's signature of this message from the time when U certifies his own $PK_U$. (Indeed V may be the inspecting authority himself). A better approach would be for the user presenting a verification key $PK_U$ to be asked to sign a message randomly selected by the authority. This approach, while better than the fixed message approach, may enable the authority to trick the user into signing something against his own will.

A still better alternative would be to have the authority choose a message $M_A$ and the user choose a message $M_U$. The user then could sign $H(M_A!M_U)$, where ! is a concatenation operator and H is a secure function, such as a secure hash function. If the identification of the user and the witnessing of his selection for the public key occurs in a person-to-person meeting between the user and authority, the user would be obliged to carry a suitable signing device, which under some circumstances may be impractical.

Therefore, in the preferred embodiment of the present invention, it is desired to have the user U sign, relative to his presented verification key $PK_U$, a predetermined message such as the message "U is the owner of $PK_U$". If desired possibly, additional pieces of information, such as the date, can be included in the predetermined message. The authority may in fact identify that the presenting user is indeed U. This preferred method presents the advantage that the signed message, while not always the same for all users, is of a standard form, and can thus be signed off-line by the presenting user. Indeed, the user need not bring a signing device even if a direct meeting with the authority is required; rather it suffices that he exhibits somehow (even remotely) the required signature in a computer diskette, or memory card, or printed on a piece of paper. Alternatively, the user may memorize it, or exhibit it by means of any other convenient medium. Moreover, the method is secure, since a malicious V cannot have utilized the message "U is the owner of public key $PK_U$" signed by U when he had his own key certified; in fact, V will not succeed in identifying himself as U. Also, the authority cannot possibly trick a presenting user to sign something against his will.

It should also be noted that the signature schemes used by the users (to sign their messages) may be different from the signature schemes used by the authorities to sign their messages. In addition, as used herein if the key of an authority is universally known, then the key is considered to be "certified" and the certificate of the key may be empty.

It should be appreciated by those skilled in the art that the specific embodiments disclosed above may be readily utilized as a basis for modifying or designing other methods and techniques for carrying out the same purposes of the present invention. It should also be realized by those skilled in the art that such equivalent constructions do not depart from the spirit and scope of the invention as set forth in the appended claims.

What is claimed is:

1. A method for certifying pieces of data in a secure communications system with at least two levels of authorities, comprising the steps of:
   presenting a piece of data requiring certification to a first-level authority for inspection of a given property;
   if the piece of data passes the inspection of the first-level authority, having the first-level authority send to a higher authority a digital signature evidencing that the piece of data has passed the inspection of the first-level authority; and
   if the digital signature of the first-level authority is correct, having the higher authority issue a certificate, which does not include a signature of the first level authority, that the piece of data possesses the given property.

2. The method of certifying as described in claim 1 wherein the piece of data presented is a verification key of a digital signature scheme.

3. The method of certifying as described in claim 2 wherein the given property of the presented verification key is that a given user has chosen the verification key to be the public key in the digital signature scheme.

4. The method of certifying as described in claim 3 wherein the first-level authority's inspection also includes identifying the presenting user.

5. The method of certifying as described in claim 4 wherein the inspection of the presented verification key also includes checking the digital signature of a given message, signed and provided by the user, relative to said verification key.

6. The method of certifying as described in claim 5 wherein the inspection of the presented verification key also includes checking the digital signature of the given message, relative to said verification key, to determine the presenting user is the owner of the presented verification key.

7. The method of certifying as described in claim 3 wherein the first-level authority's inspection includes verifying that the presenting user knows a secret signing key associated with the presented verification key.

8. The method of certifying as described in claim 3 wherein the first-level authority's inspection includes checking the digital signature of a given message provided by the user relative to the presented verification key.

9. A method for certifying public keys of a digital signature scheme where there is at least one authority A with a certified public verification key $PK_A$, comprising the steps of:

having a user U present an authority B, having a verification key $PK_B$, a verification key $PK_U$ together with a message correctly signed with respect to verification key $PK_U$;

having authority B identify the presenting user as U;

having authority B verify that the presented digital signature of U is a correct digital signature of the message with respect to the presented verification key $PK_U$;

having authority B compute a digital signature S relative to $PK_B$ of the fact that $PK_U$ is a legitimate public key of user U; and having authority A issue a certificate that $PK_U$ is the public key of user U, which can be verified without a separate certificate for $PK_B$, the certificate including a certificate for $PK_A$ whenever $PK_A$ is not certified by virtue of being universally known to users of the signature scheme.

10. A method for certifying public keys of a digital signature scheme in a secure communications system where there is at least one authority with a certified public verification key $PK_A$, comprising the steps of:

having a user U present an authority a verification key $PK_U$;

having the authority identify the presenting user as U;

having the authority verify that the presenting user knows the secret signing key associated with $PK_U$;

having the authority compute a digital signature S relative to $PK_A$ of the fact that $PK_U$ is the public key of user U; and having the authority issue a certificate that $PK_U$ is the public key of user U, the certificate including both S and a certificate for $PK_A$.

11. The method of certifying as described in claim 10 wherein the step of having the authority verify the secret signing key further includes the steps of:

having the user present a message signed with the digital signature of the user according to the private key of the user; and having the authority verify the message using the public key of the user to verify user knowledge of the private key of the user.

12. The method of certifying as in claim 11 wherein the message comprises a message randomly selected by the authority.

13. The method of certifying as in claim 11 wherein the message comprises:

a first portion selected by the authority; and a second portion selected by the user.

14. The method of certifying as in claim 11 wherein the message comprises a predetermined message having elements specific to the user.

15. A method for certifying public keys of a digital signature scheme where there are a plurality of authorities $A_1, \ldots, A_n$, where each authority $A_i$ has a secret signing key $SK_i$ and a matching verification key $PK_i$ known to $A_{i+1}$, and a verification key of $A_n$, $PK_n$, is already certified or universally known to users of a signature scheme, comprising the steps of:

having user U present $A_1$ a verification key $PK_U$;

having authority $A_1$ verify, by means of a predetermined procedure, that $PK_U$ possesses some properties out of a set of predetermined properties;

for $i<n$, having authority $A_i$ send authority $A_{i+1}$ at least a properly chosen digital signature, with respect to verification key $PK_i$, indicating that $PK_U$ has been verified to possess some predetermined properties;

having $A_n$ issue a certificate for $PK_U$ which can be verified to be correct given a certificate for $PK_n$, which certificate for $PK_U$ does not include at least one certificate for $PK_i$ for some $i<n$, but which may include a certificate for $PK_n$ if $PK_n$ is not universally known to the users of the signature scheme.

16. A method for certifying public keys in a digital signature scheme as in claim 15, wherein the predetermined properties include the time at which $PK_U$ has been presented.

17. A method for certifying public keys in a digital signature scheme as in claim 15, wherein the certificate for $PK_U$ includes additional information.

18. A method for certifying public keys in a digital signature scheme as in claim 15, wherein the certificate for the verification key $PK_U$ produced by $A_n$ includes a digital signature sent by authority $A_1$ to authority $A_2$.

19. A method for certifying public keys in a digital signature scheme as in claim 15, wherein the certificate for the verification key $PK_U$ produced by $A_n$ includes the digital signature sent by authority $A_i$ to authority $A_{i+1}$ for $i<n$.

20. A method for certifying public keys in a digital signature scheme as in claim 15, where, for $i<n$, each authority $A_{i+1}$ stores the digital signatures received by authority $A_i$.

21. A method for certifying public keys in a digital signature scheme as in claim 15, where, for certifying a given verification key $PK_U$, whenever $j<i<n$, authority $A_i$ also sends to authority $A_{i+1}$ the signature of authority $A_j$.

22. A method for certifying public keys of a digital signature scheme where there are a plurality of authorities $A_1, \ldots, A_n$, where each $i<n$ authority $A_i$ can send authority $A_{i+1}$ authenticated messages so that at least $A_{i+1}$ can be sure that these messages genuinely come from $A_i$, and authority $A_n$ has a signing key $SK_n$ and an associated public key $PK_n$, which is either certified or universally known to users of a signature scheme, comprising the steps of:

having a verification key $PK_U$ presented to authority $A_1$;

having authority $A_1$ verify, by means of a predetermined procedure, that $PK_U$ possesses some properties out of a set of predetermined properties;

for all $i<n$, having authority $A_i$ send authority $A_{i+1}$ an authenticated message indicating that $PK_U$ has been verified to possess some predetermined properties;

having $A_n$ issue a certificate for $PK_U$ which can be verified valid if $PK_n$ is known to be the public key of authority $A_n$, and which may include a certificate for $PK_n$ if $PK_n$ is not universally known to the users of the signature scheme, wherein the certificate for $PK_U$ does not include any certificate relative to authority $A_i$ for some $i<n$.

23. A method for certifying public keys of a digital signature scheme where there is at least one authority with a certified public verification key $PK_A$, comprising the steps of:

having a user U present an authority a verification key $PK_U$ together with a message correctly signed with respect to verification key $PK_U$ and indicating that U is the owner of verification key $PK_U$;

having the authority identify the presenting user as U;

having the authority verify that the presented digital signature of U is a correct digital signature of the message with respect to the presented verification key $PK_U$;

having the authority compute a digital signature S relative to $PK_U$ of the fact that $PK_U$ is a legitimate public key of user U; and having the authority issue a certificate that $PK_U$ is the public key of user U, the certificate including both S and a certificate for $PK_U$.

* * * * *

REEXAMINATION CERTIFICATE (3127th)

United States Patent [19]

Micali

[11] B1 5,420,927

[45] Certificate Issued Feb. 4, 1997

[54] METHOD FOR CERTIFYING PUBLIC KEYS IN A DIGITAL SIGNATURE SCHEME

[76] Inventor: Silvio Micali, 459 Chestnut Hill Ave., Brookline, Mass. 02146

Reexamination Request:
No. 90/004,215, Apr. 10, 1996

Reexamination Certificate for:
Patent No.: 5,420,927
Issued: May 30, 1995
Appl. No.: 189,248
Filed: Feb. 1, 1994

[51] Int. Cl.$^6$ .................................................... H04K 1/00
[52] U.S. Cl. ................................. 380/23; 380/21; 380/30; 380/4
[58] Field of Search ..................... 380/21, 23, 25, 380/30, 49

[56] References Cited

PUBLICATIONS

Network Working Group Request for Comments: 1114, "Privacy Enhancement for Internet Electronic Mail: Part II—Certificate Based Key Management" Aug. 1989, pp. 1–22.

*Primary Examiner*—David C. Cain

[57] ABSTRACT

A method for certifying public keys of a digital signature scheme in a secure communications system is provided. The secure communications system is one in which there are authorities with previously-certified public verification keys. The method begins by having a user U present an authority a verification key $PK_U$. The authority then identifies the presenting user as U. Thereafter, the authority verifies that the presenting user knows the secret signing key associated with $PK_U$. If so, the authority computes a digital signature S relative to the authority's own public key $PK_A$ of its verification that $PK_U$ is the public key of the user U. The authority then issues a certificate that $PK_U$ is the public key of user U, the certificate including both S and a certificate for $PK_A$.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 9, 10, 15, 18, 19, 21–23 are determined to be patentable as amended.

Claims 2–8, 11–14, 16, 17, 20, dependent on an amended claim, are determined to be patentable.

New claims 24–47 are added and determined to be patentable.

1. A method for certifying pieces of data in a secure communications system with at least two levels of authorities, comprising the steps of:
  presenting a piece of data requiring certification to a first-level authority for inspection of a given property;
  if the piece of data passes the inspection of the first-level authority, having the first-level authority send to a higher authority a digital signature evidencing that the piece of data has passed the inspection of the first-level authority; and
  if the digital signature of the first-level authority is correct, having the higher authority issue a certificate, which does not include a signature of the first level authority, that the piece of data possesses the given property, *wherein the first-level authority is kept accountable for the pieces of data that the first-level authority causes to be certified.*

9. A method for certifying public keys of a digital signature scheme where there is at least one authority A with a certified public verification key $PK_A$, comprising the steps of:
  having a user U present an authority B, having a verification key $PK_B$, a verification key $PK_U$ together with a message correctly signed with respect to verification key $PK_U$;
  having authority B identify the presenting user as U;
  having authority B verify that the presented digital signature of U is a correct digital signature of the message with respect to the presented verification key $PK_U$;
  having authority B compute a digital signature S relative to $PK_B$ of the fact that $PK_U$ is a legitimate public key of user U; and
  having authority A issue a certificate that $PK_U$ is the public key of user U, which can be verified without a separate certificate for $PK_B$, the certificate including a certificate for $PK_A$ wherever $PK_A$ is not certified by virtue of being universally known to users of the signature scheme, *wherein authority B is kept accountable for the keys that authority B causes to be certified.*

10. A method for certifying public keys of a digital signature scheme [in a secure communications system where there is at least one authority with a certified public verification key $PK_A$,] *according to claim 9, further comprising the [steps] step of:*
  [having a user U present an authority a verification key $PK_U$;
  having the authority identify the presenting user as U;]
  having the authority B verify that the presenting user knows the secret signing key associated with $PK_U$[;
  having the authority compute a digital signature S relative to $PK_A$ of the fact that $PK_U$ is the public key of user U; and
  having the authority issue a certificate that $PK_U$ is the public key of user U, the certificate including both S and a certificate for $PK_A$].

15. A method for certifying public keys of a digital signature scheme where there are a plurality of authorities $A_1, \ldots, A_n$, where each authority $A_i$ has a secret signing key $SK_i$ and a matching verification key $PK_i$ known to $A_{i+1}$, and a verification key of $A_n$, $PK_n$, is already certified or universally known to users of a signature scheme, comprising the steps of:
  having user U present $A_1$ a verification key $PK_U$;
  having authority $A_1$ verify, by means of a predetermined procedure, that $PK_U$ possesses some properties out of a set of predetermined properties;
  for i<n, having authority $A_i$ send authority $A_{i+1}$ at least a properly chosen digital signature, with respect to verification key $PK_i$, indicating that $PK_U$ has been verified to possess some predetermined properties;
  having $A_n$ issue a certificate for $PK_U$ which can be verified to be correct given a certificate for $PK_n$, which certificate for $PK_U$ does not include at least one certificate for $PK_i$ for some i<n, but which may include a certificate for $PK_n$ if $PK_n$ is not universally known to the users of the signature scheme, *wherein at least one of the authorities, $A_j$ j<n, is kept accountable for keys that the are caused to be certified by $A_j$.*

18. A method for certifying public keys in a digital signature scheme as in claim 15, wherein [the certificate for the verification key $PK_U$ produced by $A_n$ includes a digital signature sent by authority $A_1$ to authority $A_2$] *information is stored in order to keep $A_j$ accountable.*

19. A method for certifying public keys in a digital signature scheme as in claim [15, wherein the certificate for the verification key $PK_U$ produced by $A_n$ includes the digital signature sent by authority $A_i$ to authority $A_{i+1}$ for i<n] *18, wherein the information that is stored includes a digital signature of $A_j$.*

21. A method for certifying public keys in a digital signature scheme as in claim [15, where, for certifying a given verification key $PK_U$, whenever j<i<n, authority $A_i$ also sends to authority $A_{i+1}$ the signature of authority $A_j$] *19, wherein the digital signature is stored by an authority $A_k$, where k>j.*

22. A method for certifying public keys of a digital signature scheme where there are a plurality of authorities $A_1, \ldots, A_n$, where each i<n authority $A_i$ can send authority $A_{i+1}$ authenticated messages so that at least $A_{i+1}$ can be sure that these messages genuinely come from $A_i$, and authority $A_n$ has a signing key $SK_n$ and an associated public key $PK_n$, which is either certified or universally known to users of a signature scheme, comprising the steps of:
  having a verification key $PK_U$ presented to authority $A_1$;
  having authority $A_1$ verify, by means of a predetermined procedure, that $PK_U$ possesses some properties out of a set of predetermined properties;

for all i<n, having authority $A_i$ send authority $A_{i+1}$ an authenticated message indicating that $PK_U$ has been verified to possess some predetermined properties;

having $A_n$ issue a certificate for $PK_U$ which can be verified valid if $PK_n$ is known to be the public key of authority $A_n$, and which may include a certificate for $PK_n$ if $PK_n$ is not universally known to the users of the signature scheme, wherein the certificate for $PK_U$ does not include any certificate relative to authority $A_i$ for some i<n and wherein $A_i$ is kept accountable for keys that are caused to be certified by $A_i$.

23. A method for certifying public keys [of a digital signature scheme where there is at least one authority with a certified public verification key $PK_A$, comprising the steps of:

having a user U present an authority a verification key $PK_U$ together with a message correctly signed with respect to verification key $PK_U$ and indicating that U is the owner of verification key $PK_U$;

having the authority identify the presenting user as U;

having the authority verify that the presented digital signature of U is a correct digital signature of the message with respect to the presented verification key $PK_U$;

having the authority compute a digital signature S relative to $PK_U$ of the fact that $PK_U$ is a legitimate public key of user U; and having the authority issue a certificate that $PK_U$ is the public key of user U, the certificate including both S and a certificate for $PK_U$], according to claim 22, wherein information is stored in order keep $A_i$ accountable.

24. A method for certifying, according to claim 1, wherein information is stored in order keep the first-level authority accountable.

25. A method for certifying, according to claim 24, wherein the stored information includes the digital signature of the first-level authority.

26. A method of certifying, according to claim 25, wherein the piece of data presented is a verification key of a digital signature scheme.

27. A method of certifying, according to claim 26, wherein the given property of the presented verification key is that a given user has chosen the verification key to be the public key in the digital signature scheme.

28. A method of certifying, according to claim 27, wherein the first-level authority's inspection also includes identifying the present user.

29. A method of certifying, according to claim 28, wherein the inspection of the presented verification key also includes checking the digital signature of a given message, signed and provided by the user, relative to said verification key.

30. A method of certifying, according to claim 29, wherein the inspection of the presented verification key also includes checking the digital signature of the given message, relative to said verification key, to determine the presenting user is the owner of the presented verification key.

31. A method of certifying, according to claim 27, wherein the first-level authority's inspection includes verifying that the presenting user knows a secret signing key associated with the presented verification key.

32. A method of certifying, according to claim 27, wherein the first-level authority's inspection includes checking the digital signature of a given message provided by the user relative to the presented verification key.

33. A method for certifying, according to claim 9, wherein information is stored in order keep the authority B accountable.

34. A method for certifying, according to claim 33, wherein the stored information includes the digital signature of the authority B.

35. A method for certifying public keys of a digital signature scheme, according to claim 34, further comprising the step of:

having the authority B verify that the presenting user knows the secret signing key associated with $PK_U$.

36. A method of certifying, according to claim 35, wherein the step of having the authority verify the secret signing key further includes the steps of:

having the user present a message signed with the digital signature of the user according to the private key of the user; and having the authority verify the message using the public key of the user to verify user knowledge of the private key of the user.

37. A method of certifying, according to claim 36, wherein the message comprises a message randomly selected by the authority.

38. A method of certifying, according to claim 36, wherein the message comprises:

a first portion selected by the authority; and a second portion selected by the user.

39. A method of certifying, according to claim 36, wherein the message comprises a predetermined message having elements specific to the user.

40. A method for certifying public keys, according to claim 15, wherein j=1.

41. A method for certifying public keys, according to claim 40, wherein information is stored in order to keep $A_1$ accountable.

42. A method for certifying public keys, according to claim 41, wherein the information that is stored includes a digital signature of $A_1$.

43. A method for certifying public keys, according to claim 40, wherein all authorities are kept accountable for keys that are caused to be certified by the authorities.

44. A method for certifying public keys, according to claim 43, wherein information is stored in order to keep the authorities accountable.

45. A method for certifying public keys, according to claim 44, wherein the information that is stored includes a digital signature of each of the authorities.

46. A method for certifying public keys, according to claim 45, wherein, for i<n, each authority $A_{i+1}$ stores the digital signatures received by authority $A_i$.

47. A method for certifying, according to claim 23, wherein the stored information includes the digital signature of $A_i$.

* * * * *